(12) United States Patent
Tien

(10) Patent No.: US 10,894,442 B2
(45) Date of Patent: Jan. 19, 2021

(54) HUB WITH DISENGAGING EFFECT OF RATCHET FACES IN AN IDLE MODE

(71) Applicant: FOSS WORLDWIDE INC., Taichung (TW)

(72) Inventor: Tseng-Ping Tien, Taichung (TW)

(*) Notice: Subject to any disclaimer, the term of this patent is extended or adjusted under 35 U.S.C. 154(b) by 125 days.

(21) Appl. No.: 16/250,637

(22) Filed: Jan. 17, 2019

(65) Prior Publication Data

US 2019/0241015 A1 Aug. 8, 2019

(30) Foreign Application Priority Data

Feb. 6, 2018 (TW) .............................. 107104113 A

(51) Int. Cl.
| | |
|---|---|
| *B60B 27/04* | (2006.01) |
| *B60B 27/00* | (2006.01) |
| *B60B 27/02* | (2006.01) |
| *F16D 41/28* | (2006.01) |
| *F16D 41/30* | (2006.01) |
| *F16F 1/04* | (2006.01) |
| *F16F 1/32* | (2006.01) |

(52) U.S. Cl.
CPC ........ *B60B 27/047* (2013.01); *B60B 27/0031* (2013.01); *B60B 27/023* (2013.01); *B60B 27/026* (2013.01); *F16D 41/28* (2013.01); *F16D 41/30* (2013.01); *F16F 1/04* (2013.01); *F16F 1/328* (2013.01); *B60B 2900/111* (2013.01); *B60B 2900/1212* (2013.01); *B60B 2900/931* (2013.01)

(58) Field of Classification Search
CPC .......... F16D 41/22; F16D 41/24; F16D 11/14; F16D 2023/123; B60B 27/047
See application file for complete search history.

(56) References Cited

U.S. PATENT DOCUMENTS

| | | | |
|---|---|---|---|
| 2,675,898 A * | 4/1954 | Morgan ................. | F16D 41/22 192/41 R |
| 3,306,406 A * | 2/1967 | Poliseo ................... | F16D 41/22 192/46 |
| 3,433,337 A * | 3/1969 | Salter ..................... | F16D 41/22 192/46 |
| 4,226,317 A * | 10/1980 | Nagano ................... | B62M 9/10 192/64 |

(Continued)

*Primary Examiner* — Stacey A Fluhart
(74) *Attorney, Agent, or Firm* — Egbert Law Offices, PLLC

(57) ABSTRACT

A hub with disengaging effect of ratchet faces in an idle mode includes: a gear barrel with first and second housing parts is located at the spacing from the driven end of the hub; a ratchet disc fixed in the driven end has a first annular ratchet face corresponding to the gear barrel; a double-sided free toothed disc disposed in the first housing part is in synchronous rotation with the gear barrel, and includes a second annular ratchet face, which is in a single steering engagement drive relationship with the first annular ratchet face; an elastic expansion member is disposed between the ratchet and double-sided free toothed discs, to push off annular ratchet faces in idle mode; a repulsion disc is mounted in the second housing part at the circumferential direction; an axial repulsion member has repulsion parts which are respectively disposed in the double-sided free toothed and repulsion discs.

7 Claims, 9 Drawing Sheets

(56) References Cited

U.S. PATENT DOCUMENTS

| | | | | |
|---|---|---|---|---|
| 5,515,957 A | * | 5/1996 | McConaghy | F16D 41/28 |
| | | | | 192/64 |
| 6,386,566 B1 | * | 5/2002 | Freeberg | B62K 9/02 |
| | | | | 188/24.17 |
| 8,955,660 B2 | * | 2/2015 | Kozak | B60B 27/047 |
| | | | | 192/64 |
| 2017/0247212 A1 | * | 8/2017 | Uohashi | B65H 3/0669 |
| 2018/0083384 A1 | * | 3/2018 | Burns | H01R 13/622 |

* cited by examiner

HUB WITH DISENGAGING EFFECT OF RATCHET FACES IN AN IDLE MODE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a bicycle hub, and more particularly to an innovative hub with disengaging effect of ratchet faces from each other in an idle mode.

2. Description of Related Art Including Information Disclosed Under 37 CFR 1.97 and 37 CFR 1.98

In the design of the bicycle hub structure, in order to enable the user to drive the rear wheel forward when stepping on the pedal (i.e., stepping forward), but when the user does not step on the pedal, the rear wheel can still rotate forward without being affected by the pedal in an idle mode. This function is usually achieved through the configuration of ratchet components.

Making a comprehensive view on the structure of the ratchet assembly of the conventional bicycle hub, the inner ratchet disc and the outer ratchet disc are generally in a state of elastic engagement with each other as a switching member of its main state, wherein the inner ratchet disc rotates together with the hub, the outer ratchet disc rotates together with the gear driving cylinder of the bicycle. When the outer ratchet disc rotates forward by indirect action due to the pedal being stepped on forward, its single oblique tooth face is engaged into the single oblique tooth face of the inner ratchet disc in an engagement drive state. Conversely, when the user does not step on the pedal, the single oblique tooth face between the inner ratchet disc and the outer ratchet disc will repel and push each other in a relative dislocation jumping state, in which, usually the bicycle rider can clearly hear the tooth surface friction sound emitted by the relative dislocation jumping of the single oblique tooth face. It can be known that when the rear wheel of the bicycle is in the idle mode, although the single oblique tooth faces provided by the inner ratchet disc and the outer ratchet disc in the ratchet assembly can retreat from each other, but in essence, there is still considerable friction resistance between two tooth faces, and this frictional resistance is bound to cause relatively large advance obstacle for the high speed and pedaling force output efficiency required by the bicycle, especially there is a more significant impact on the competitive bicycle.

Thus, facing the current and future trend of the bicycle lightweight development, how to achieve lower resistance or even zero resistance of the hub ratchet assembly in idle mode becomes an important technical issue that cannot be ignored by the relevant industry.

BRIEF SUMMARY OF THE INVENTION

The present invention mainly aims to provide a hub with disengaging effect of ratchet faces in an idle mode. The technical feature of the present invention is to solve the problem, the hub comprises: a mandrel in a fixed state; a hub, which is screwed in the mandrel, and the hub with a driven end at the axial direction; a gear barrel is screwed in the mandrel and located at the axial spacing from the driven end of the hub. The outer circumference of the gear barrel has a gear sleeve, and one end of the gear barrel corresponding to the driven end of the hub is inward concave to sequentially form a housing part and a second housing part, wherein the gear barrel is operated in three modes including a forward rotation, a reverse rotation and a non-rotation with respect to the hub; a ratchet disc fixed to the driven end of the hub and in synchronous rotation relationship with the hub, the ratchet disc has a first annular ratchet face corresponding to the gear barrel, the first annular ratchet face includes a plurality of first single oblique tooth rim; a double-sided free toothed disc is mounted in the first housing part of the gear barrel, the double-sided free toothed disc is in synchronous rotation relationship with the gear barrel, and the double-sided free toothed disc is selectively pushed to move axially along the gear barrel, the double-sided free toothed disc includes a second annular ratchet face and a pushed face, and the second annular ratchet face includes a plurality of second single oblique tooth rim, and a single steering engagement drive relationship is formed between the second single oblique tooth rim and the first single oblique tooth rim of the first annular ratchet face; an elastic expansion member is disposed between the ratchet disc and the double-sided free toothed disc to elastically push the double-sided free toothed disc away from the ratchet disc, when the gear barrel is in the fixed non-rotation mode, the first annular ratchet face and the second annular ratchet face are disengaged from each other; a repulsion disc is mounted in the second housing part of the gear barrel, and the repulsion disc is restricted in positioning state in the circumferential direction with respect to the mandrel, and the repulsion disc has the withstanding face; an axial repulsion member includes a first repulsion part and a second repulsion part, wherein the first repulsion part is disposed on the pushed face of the double-sided free toothed disc, and the second repulsion part is disposed on the withstanding face of the repulsion disc, when the gear barrel is in the forward rotation drive mode and the double-sided free toothed disc is rotated relative to the repulsion disc, the first repulsion part and the second repulsion part will generate an axial mutual pushing force, thereby the double-sided free toothed disc is pushed in the direction of the ratchet disc, so that the second annular ratchet face is engaged with the first annular ratchet face.

The main effects and advantages of the present invention are that when the gear barrel of the hub is in the fixed mode, the double-sided free toothed disc can be elastically pushed away from the ratchet disc by the elastic expansion member, the ratchet faces of both are completely disengaged from each other, so that when the hub wheel of the bicycle is idling, the ratchet faces engaged with each other are completely disengaged to achieve zero resistance and no jamming and friction effect.

DETAILED DESCRIPTION OF THE INVENTION

Figure 1:
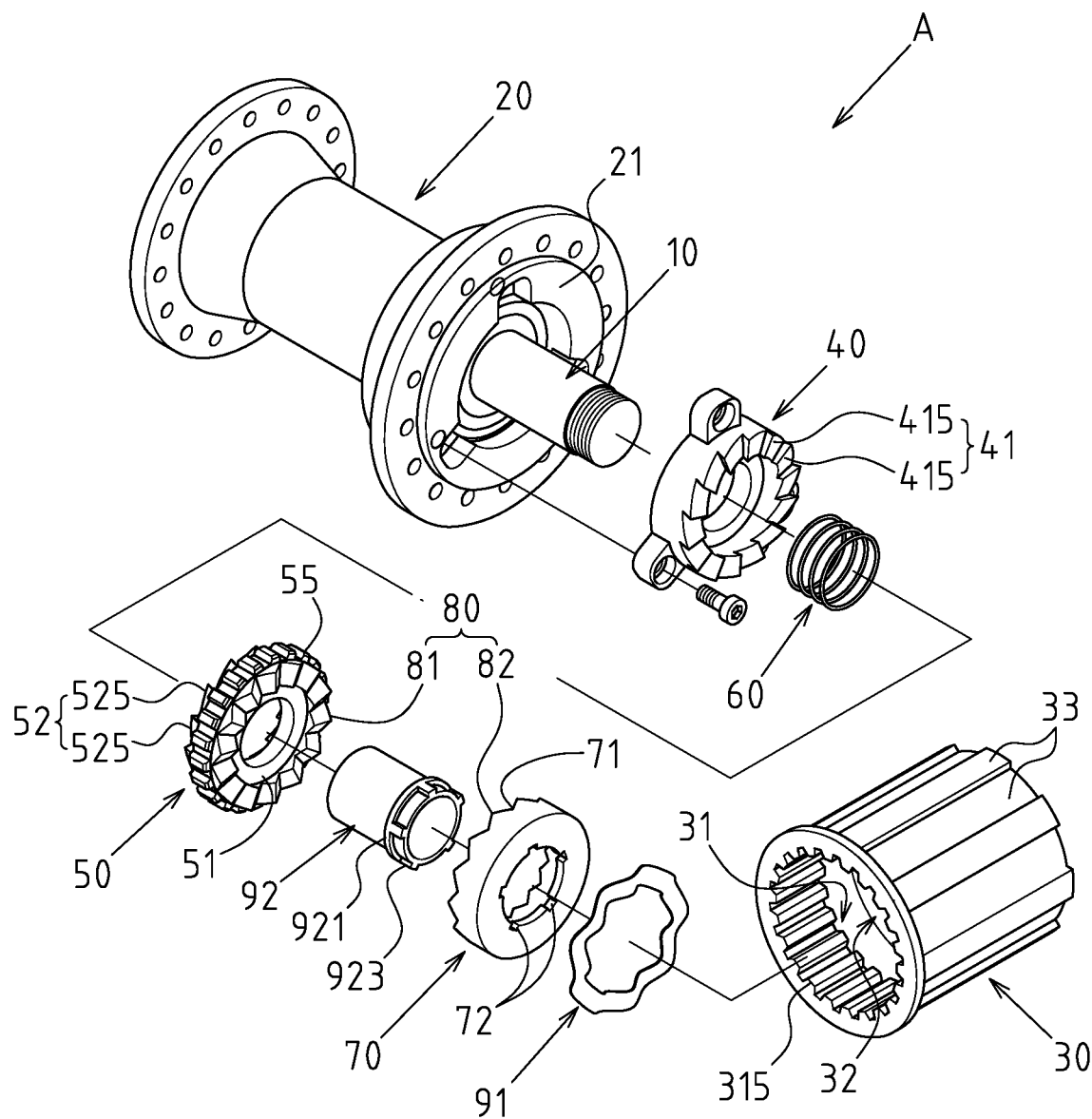
FIG. 1 is a three-dimensional diagram of the component decomposition of a better embodiment of the present invention.
Figure 2:
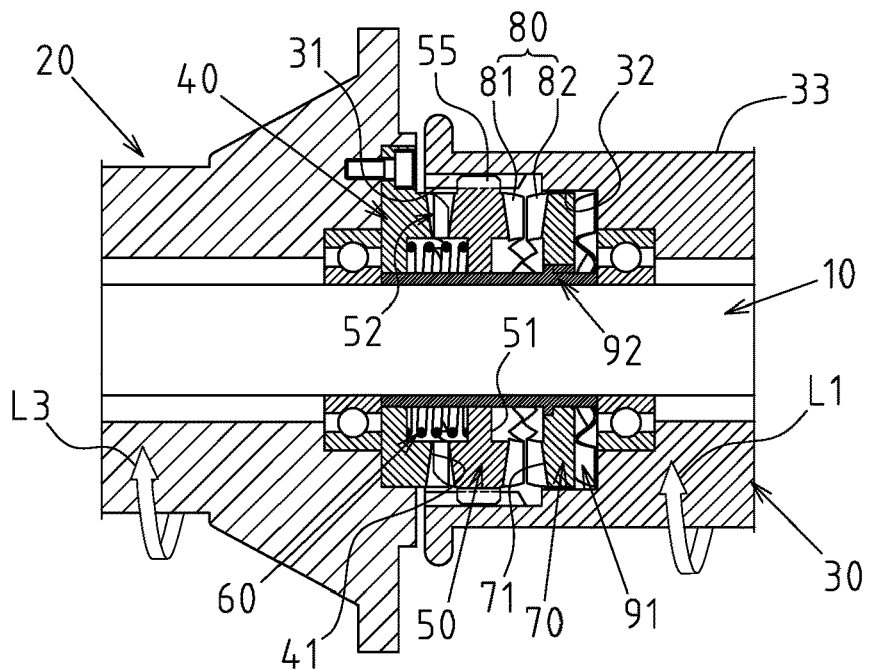
FIG. 2 is a sectional view of the gear barrel in a forward drive mode of a better embodiment of the present invention.
Figure 3:
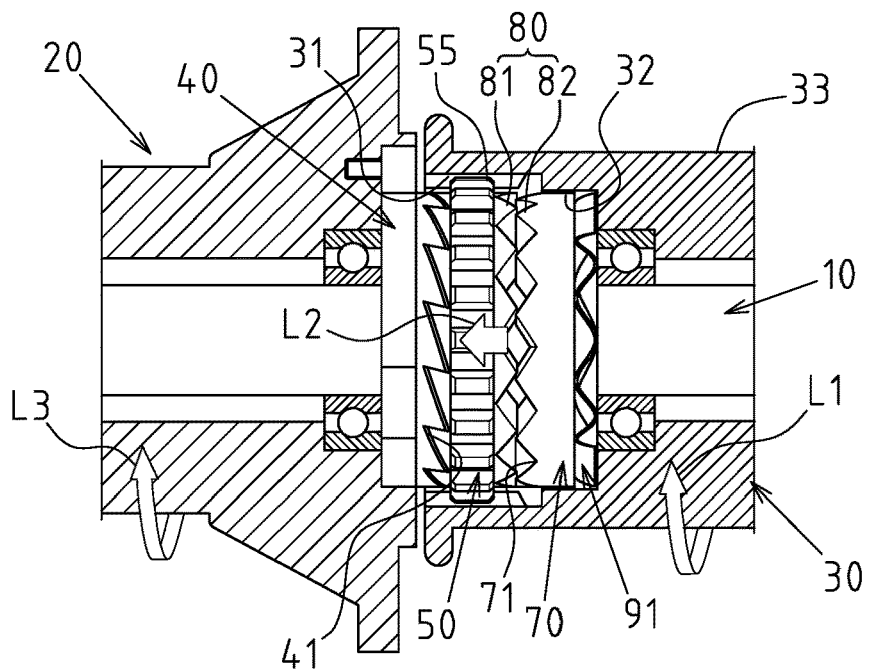
FIG. 3 is a side view of the partial component corresponding to FIG. 2.

Referring to FIGS. 1 to 3, which are the better embodiments of the hub of the present invention with a ratchet face disengagement effect during idling, but the embodiments are for illustrative purposes only and the patent application is not limited by this structure.

The hub A includes the following structure: a mandrel 10, in a fixed state; a hub 20, screwed in the mandrel 10, the hub 20 has a driven end 21 in the axial direction; a gear barrel 30, screwed in the mandrel 10 and located at axial spacing of the driven end 21 of the hub 20; the outer circumference of the gear barrel 30 has a gear sleeve 33, one end of the gear sleeve 33 corresponding to the driven end 21 of the hub 20 is inward concave to form a first housing part 31 and a second housing part 32 in sequence, and the gear barrel 30 is operatively provided with three modes with respect to the hub 20 system, namely, forward rotation, reverse rotation and non-rotation; a ratchet disc 40, fixed in the driven end 21 of the hub 20, in a synchronous rotational relationship with the hub 20, the ratchet disc 40 has a first annular ratchet face 41 corresponding to the gear barrel 30, the first annular ratchet face 41 includes a plurality of first single oblique tooth rim 415; a double-sided free toothed disc 50, mounted in the first housing part 31 of the gear barrel 30, the double-sided free toothed disc 50 is in a circumferentially synchronous relationship with the gear barrel 30, and the double-sided free toothed disc 50 is selectively pushed for the axial displacement along of the gear barrel 30, and the double-sided free toothed disc 50 includes a second annular ratchet face 52 and a pushed face 51, the second annular ratchet face 52 includes a plurality of second single oblique tooth rim 525, and the second single oblique tooth rim 525 is in a single steering engagement drive relationship with the first single oblique tooth rim 415 of the first annular ratchet face 41; an elastic expansion member 60 is disposed between the ratchet disc 40 and the double-sided free toothed disc 50 to elastically push the double-sided free toothed disc 50 away from the ratchet disc 40, when the gear barrel 30 is in the fixed mode, the first annular ratchet face 41 and the second annular ratchet face 52 are disengaged from each other; a repulsion disc 70, mounted in the second housing part 32 of the gear barrel 30, the repulsion disc 70 is restricted in positioning state in the circumferential direction relative to the mandrel 10 (i.e., the repulsion disc 70 cannot be rotated relative to the mandrel 10), and the repulsion disc 70 periphery keeps the gap with the second housing part 32 of the gear barrel 30 and unconnected, and the repulsion disc 70 has a withstanding face 71; an axial repulsion member 80 includes a first repulsion part 81 and a second repulsion part 82, wherein the first repulsion part 81 is disposed in the pushed face 51 of the double-sided free toothed disc 50, the second repulsion part 82 is disposed in the standing face 71 of the repulsion disc 70; when the gear barrel 30 is in the forward rotation drive mode and the double-sided free toothed disc 50 is rotated relative to the repulsion disc 70, an axial interaction force is generated between the first repulsion part 81 and the second repulsion part 82, thereby the double-sided free toothed disc 50 is pushed toward the ratchet disc 40 to engage the second annular ratchet face 52 with the first annular ratchet face 41.

As shown in FIG. 1, in this example, the outer circumference of the double-sided free toothed disc 50 and the first housing part 31 of the gear barrel 30 are provided with the oppositely engaged annular tooth rim 55 and 315, so that the double-sided free toothed disc 50 and the gear barrel 30 are in a synchronous rotation relationship.

Figure 3A:
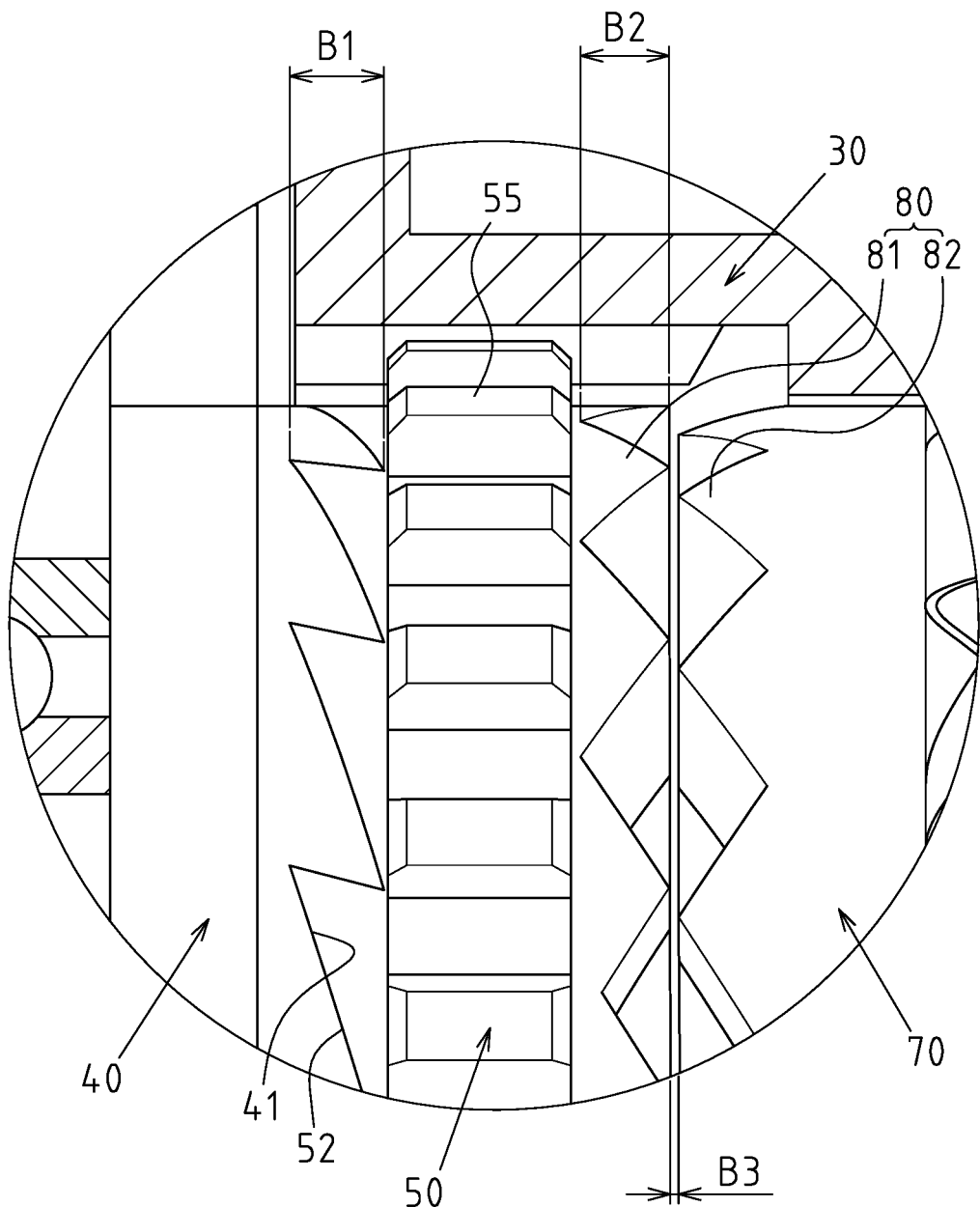
FIG. 3a is a schematic diagram of the first annular ratchet face and the second annular ratchet face to be fully engaged according to FIG. 3.

As shown in FIGS. 1-8, in this example, the first repulsion part 81 and the second repulsion part 82 of the axial repulsion member 80 are annular ridge-shaped tooth face profiles engaged with each other; the elastic top bracing member 91 is disposed between the repulsion disc 70 and one fixed face of the second housing parts 32 of the gear barrel 30, and the elastic force of the elastic top bracing member 91 is greater than the elastic force of the elastic expansion member 60, and the mandrel 10 is provided with a directional driving limiter 92 for positioning, which is used for limiting the displacement of the repulsion disc 70 within a set axial travel range; and as shown in FIG. 3a, the maximum depth of engagement between the first single oblique tooth rim 415 and the second single oblique tooth rim 525 (as shown in B1) must be greater than the maximum depth of engagement between the annular ridge-shaped tooth faces of the first repulsion part 81 and the second repulsion part 82 (as shown in B2); when the first single oblique tooth rim 415 is completely engaged tightly with the second single oblique tooth rim 525, the annular ridge-shaped tooth faces of the first repulsion part 81 and the second repulsion part 82 can be completely disengaged from each other without affecting the hub 20 driven by the gear barrel 30 (because the repulsion disc 70 can not be in rotating state relative to the mandrel 10); also in this example, the directional driving limiter 92 can be provided as a sleeve type, and sleeved on the mandrel 10, as shown in FIG. 1; it is provided with an annular rib 921 and a plurality of the axial rib 923 of the annular spacing. One end of each axial rib 923 is connected to the annular rib 921, and the other end of each of the axial rib 923 is extended to one end of the directional driving limiter 92, so that the repulsion disc 70 is provided with a plurality of axial guiding groove 72 corresponding to the axial rib 923.

As shown in FIG. 1, in this example, the elastic expansion member 60 is a coil spring, and the elastic top bracing member 91 is a wave-shaped spring, a coil spring or any one of two magnetic bodies of the same polarity is provided.

Figure 4:
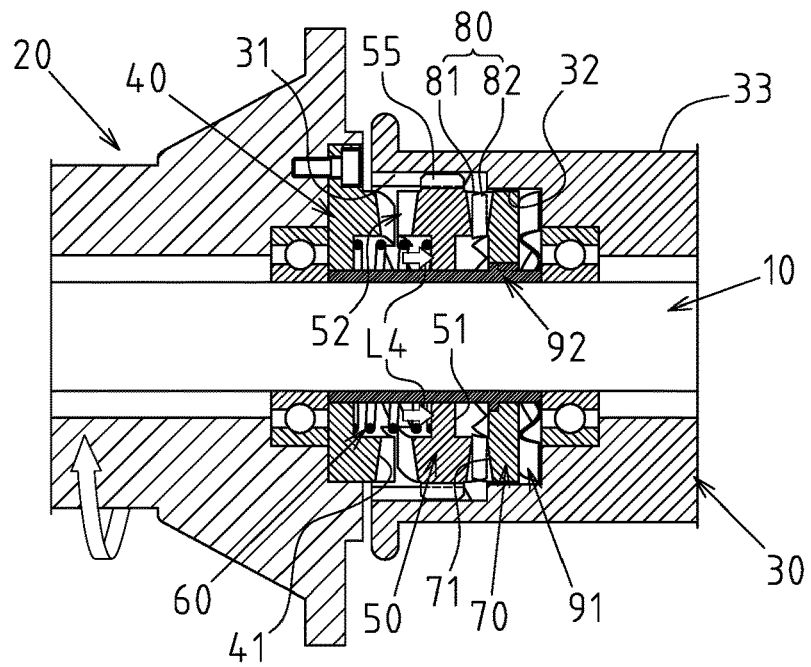
FIG. 4 is a sectional view of the gear barrel in a fixed mode of a better embodiment of the present invention.
Figure 5:
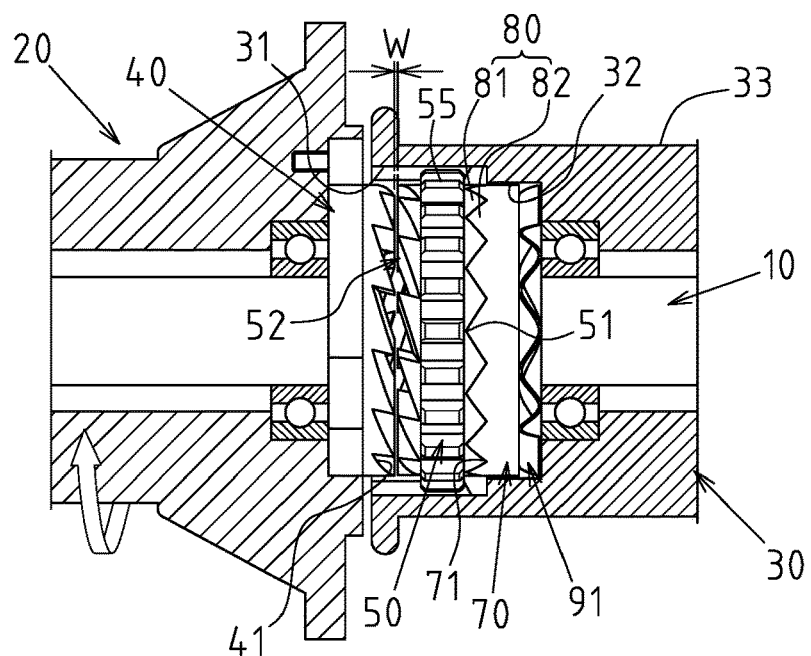
FIG. 5 is a side view of the partial component corresponding to FIG. 4.
Figure 6:
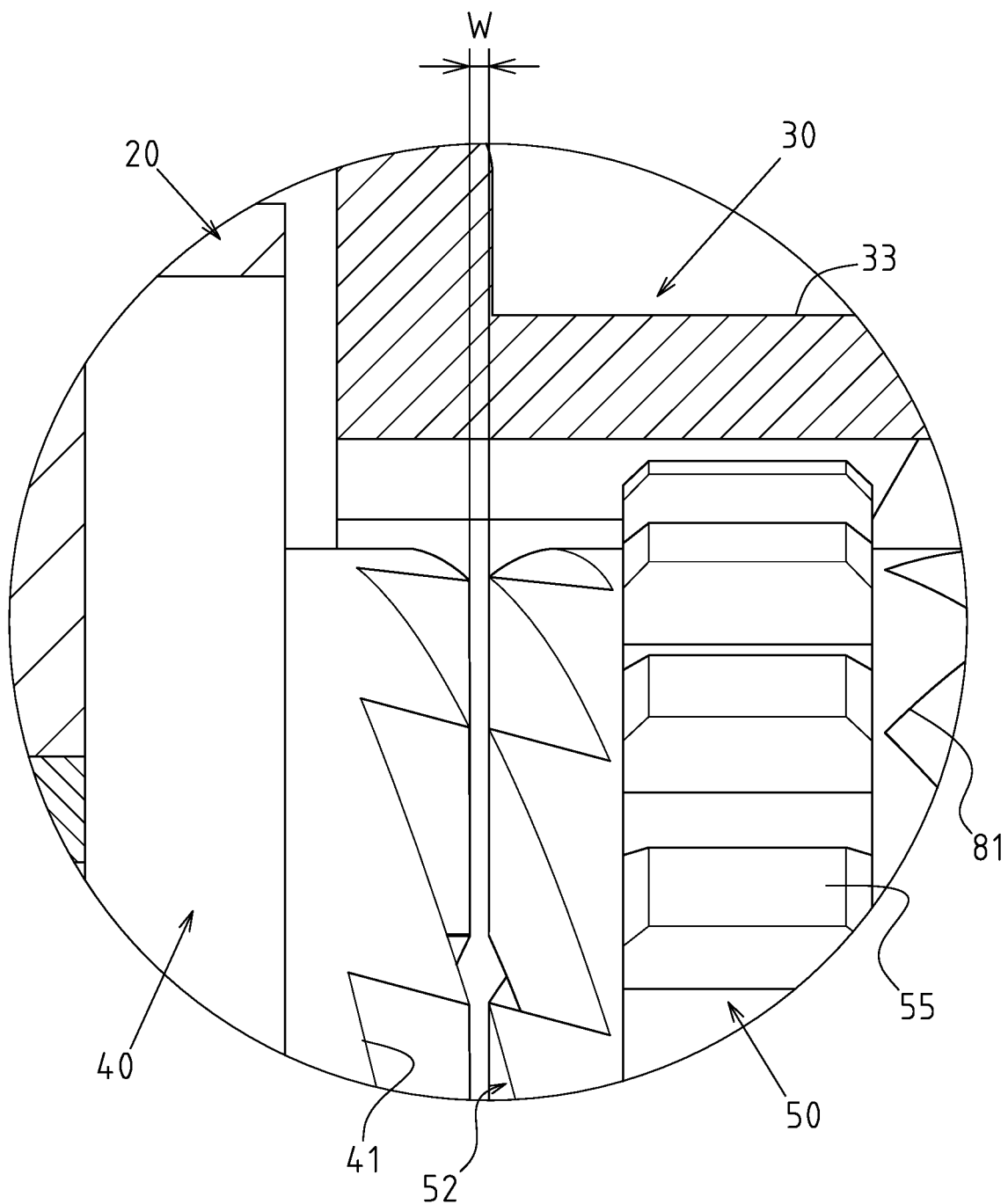
FIG. 6 is a partial enlarged schematic diagram of FIG. 5.
Figure 7:
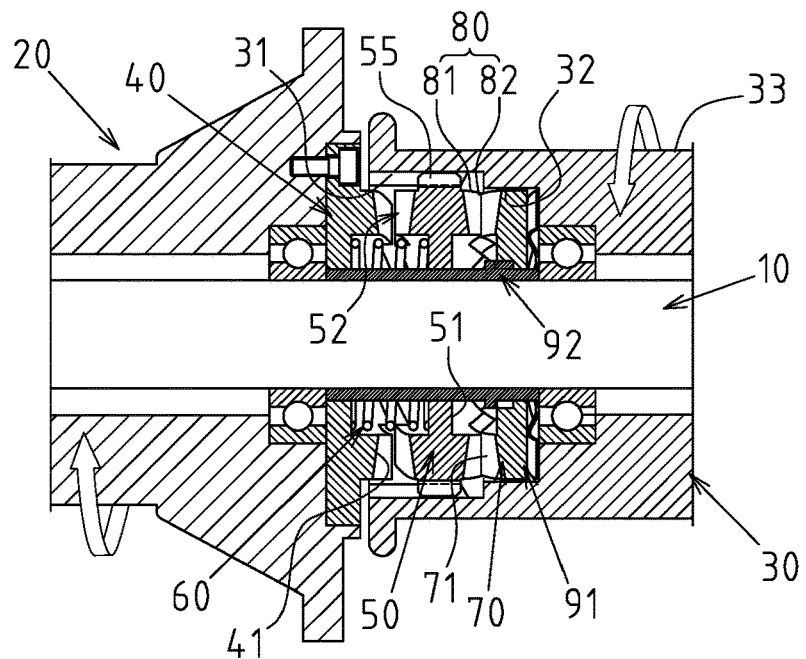
FIG. 7 is a sectional view of the gear barrel in a reverse drive mode of a better embodiment of the present invention.
Figure 8:
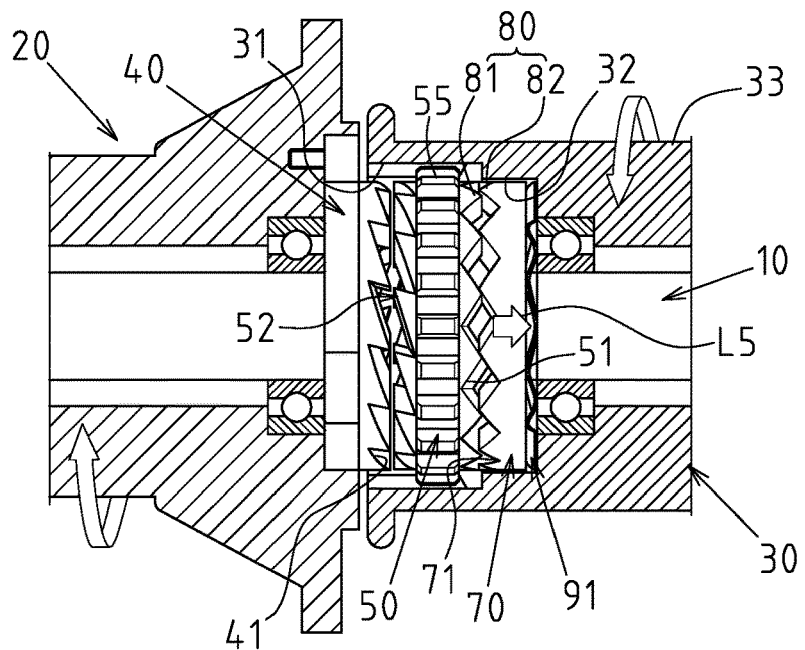
FIG. 8 is a side view of the partial component corresponding to FIG. 7.

According to the above-mentioned structural composition and technical features, the use of the actual application of the present invention is described in detail below; first, as shown in FIG. 2 and FIG. 3, the state of the gear barrel 30 in the forward rotation drive mode is shown, that is, in this state in which the rear wheel of the bicycle is forwardly driven by the pedal, wherein the double-sided free toothed disc 50 has the rotatable and axial displacement characteristics because the repulsion disc 70 is limited and positioned in steering with respect to the mandrel 10, therefore, when the gear barrel 30 is driven by the bicycle's shifting gear (not shown in the figure) and is rotated forward (as shown in the arrow L1), the first repulsion part 81 and the second repulsion part 82 second in the annular ridge-shaped tooth face engagement in the axial repulsion member 80 will drive the double-sided free toothed disc 50 to shift towards the left in the figure (as shown in arrow L2) due to mutual oblique repulsion, so that the second annular ratchet face 52 of the double-sided free toothed disc 50 is engaged with the first annular ratchet face 41 of the ratchet disc 40 to drive the hub 20 forward (as shown in arrow L3); then, as shown in FIG. 3a, when the second annular ratchet face 52 of the double-sided free toothed disc 50 is completely engaged tightly with the first annular ratchet face 41 of the ratchet disc 40 with each other, the annular ridge-shaped tooth faces of the first repulsion part 81 and the second repulsion part 82 will be disengaged from each other to form a gap (as shown in B3), and the elastic expansion member 60 is compressed for accumulating the elastic force. The part to be explained is: because the tooth face of the first annular ratchet face 41 engaged mutually with the second annular ratchet face 52 is designed with a slightly inverted hook fit state (see the shape depicted in FIG. 3a), when the gear barrel 30 is in forward rotation mode, the first annular ratchet face 41 and the second annular ratchet face 52 can obtain a state of good friction, which can ensure that both can be in a state of close mutual engagement with each other (note: using the inclined face guiding effect), and the tooth will not be disengaged not due to elastic top bracing of the elastic expansion member 60; then, as shown in FIGS. 4 and 5, the gear barrel 30 is in a fixed mode state, in this state, that is, in which the rear wheel of the bicycle is idling forward, and the double-sided free toothed disc 50 is disengaged by the pushing power of the axial repulsion member 80 to the left in the figure, so the elastic release function of the elastic expansion member 60 pushes the double-sided free toothed disc 50 back to the right in the figure (as shown in the arrow L4 of FIG. 4), at this time, since the maximum depth of the annular ridge-shaped tooth face of the first repulsion part 81 engaged with the second repulsion part 82 is greater than the maximum depth of the first single oblique tooth rim 415 engaged with the second single oblique tooth rim 525, when the double-sided free toothed disc 50 is pushed back to the right in the figure until the first repulsion part 81 is fully engaged with the second repulsion part 82, the ratchet disc 40 and the double-sided free toothed disc 50 will be completely disengaged to form a gap W (as shown in FIG. 6), a zero-resistance state is shown between the first annular ratchet face 41 and the second annular ratchet face 52, so that when the present invention can make the bicycle rear wheel in the idle mode, the hub A can reach the excellent driving quality state without ratchet jamming friction and sound, the conventional hub is not comparable to this part; then, as shown in FIGS. 7 and 8, the gear barrel 30 is in a reverse drive mode with respect to the hub 20, in this state, that is, in which the bicycle pedal is stepped backward. As the tooth face between the first repulsion part 81 and the second repulsion part 82 is dislocated due to that the double-sided free toothed disc 50 is reversely rotated by the elastic top bracing member 91, the repulsion disc 70 can be shifted to the right in the figure (as shown in the arrow L5 of FIG. 8), so that the dislocated tooth faces can be smoothly crossed over with each other, so as to avoid the tooth faces between the respective toothed discs being closely seized to each other. This is a structural protection measure in the preferred embodiment.

Figure 9:
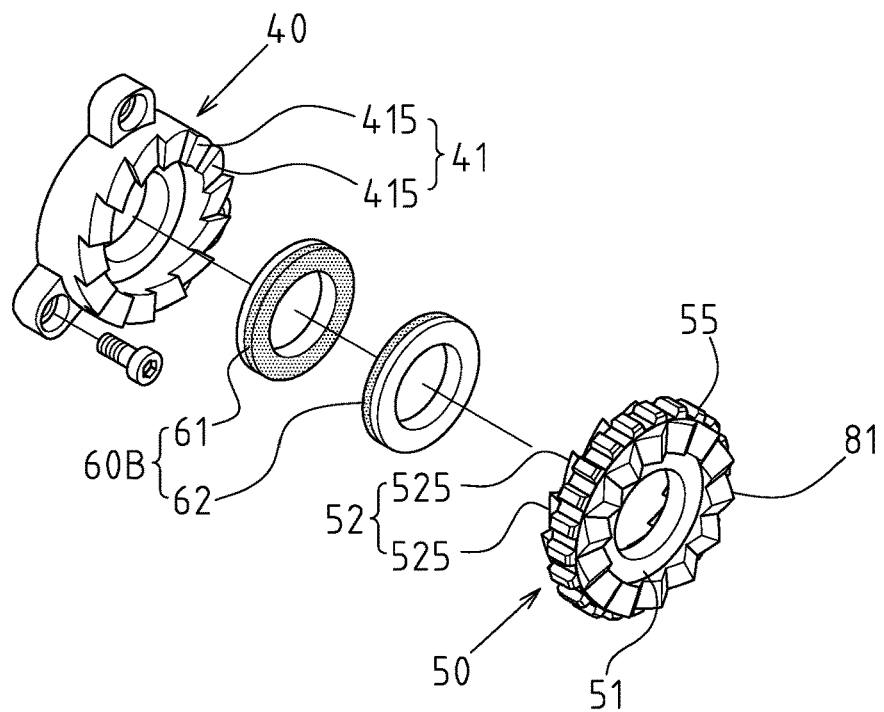
FIG. 9 is a three-dimensional decomposition diagram of the elastic expansion member consisting of first magnetic body and second magnetic body of an embodiment of the present invention.
Figure 10:
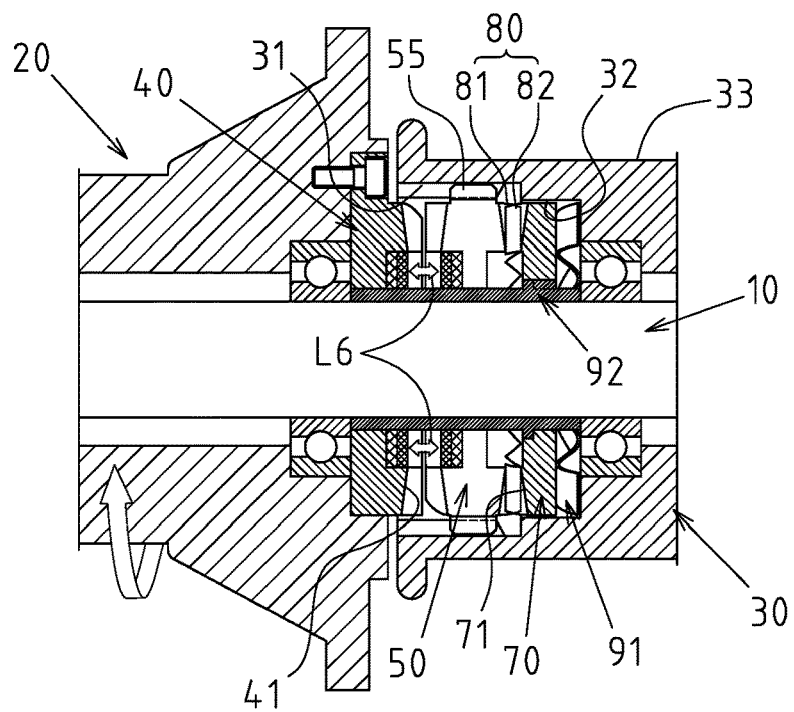
FIG. 10 is a combined sectional view of an embodiment disclosed in FIG. 9.

As shown in FIGS. 9, 10, the elastic expansion member 60B disclosed in this example is a first magnetic body 61 and a second magnetic body 62 which are respectively disposed in the ratchet disc 40 and the double-sided free toothed disc 50 in corresponding relationship with each other at interval, and the first magnetic body 61 corresponds to the second magnetic body 62 at the same polarity (such as N pole corresponds to N pole or S pole corresponds to S pole) and both show a normal repulsive relationship (as shown in the arrow L6 of FIG. 10), this type is also one of the other specific embodiments.

Figure 11:
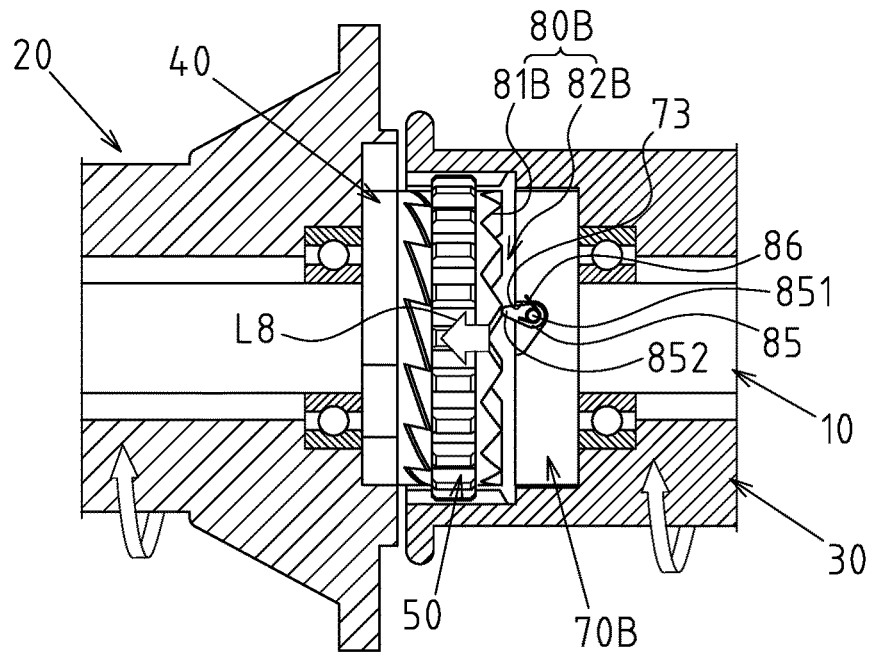
FIG. 11 is a schematic diagram of the gear barrel in a forward drive mode of another embodiment of the axial repulsion member of the present invention.
Figure 12:
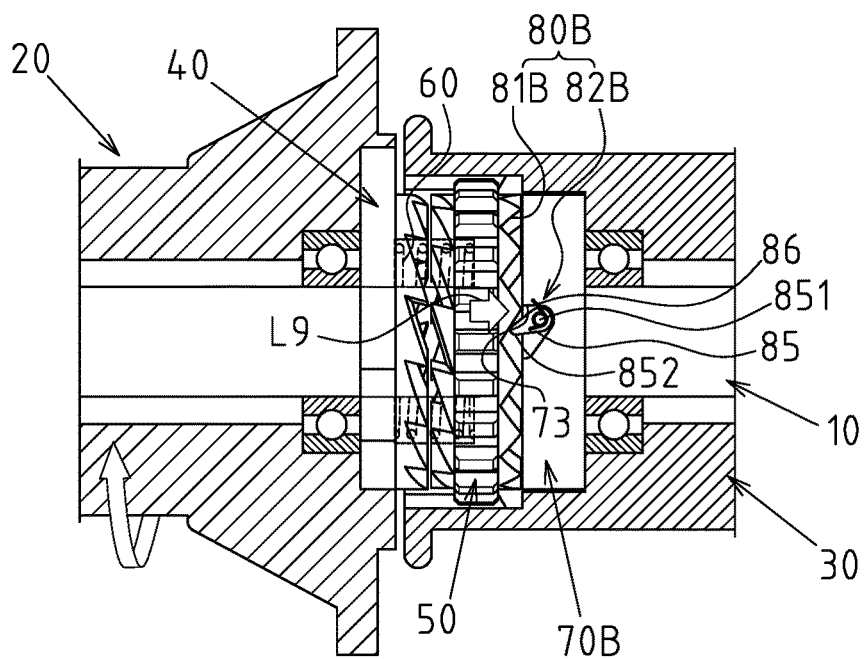
FIG. 12 is a schematic diagram of the gear barrel in a fixed mode disclosed in FIG. 11.

As shown in FIGS. 11 and 12, in this example, the first repulsion part 81B of the axial repulsion member 80B is an annular ridge-shaped tooth face type of the pushed face 51 disposed in the double-sided free toothed disc 50; the second repulsion part 82B includes a plurality of elastic swinging claw 85 of the withstanding face 71 disposed in the repulsion disc 70B. Each of the elastic swinging claws 85 includes a pivoting end 851 and bracing end 852. The bracing end 852 abuts on the tooth bottom corresponding to the annular ridge-shaped tooth face of the pushed face 51, and each of the elastic swinging claws 85 is assembled with a torsion spring 86 to set the abutting end 852 in a elastic pressed angle state. The repulsion disc 70B is in a state in which the steering and the axial position are both positioned and not displaceable with respect to the mandrel 10; The withstanding face 71 of the repulsion disc 70B is provided with a limiting rim 73 corresponding to each elastic swinging claw 85 to limit the maximum tilt angle of each elastic swinging claw 85, and when each bracing end 852 of the elastic swinging claw 85 is in the elastic pressed angle state, the elastic expansion member 60 elastically pushes the double-sided free toothed disc 50 away from the ratchet disc 40 (as shown in FIG. 12), thereby so that the first annular ratchet face 41 and the second annular ratchet face 52 are disengaged from each other. For the operation of this example, please refer to FIGS. 11 and 12, in FIG. 11, the gear barrel 30 is in the forward rotation mode. In this state, the bracing end 852 of each elastic swinging claw 85 is tilted by the first repulsion part 81B of the ridge-shaped tooth face, thereby the double-sided free toothed disc 50 is driven towards the left in the figure (as shown in the arrow L8 of FIG. 11), so that the second annular ratchet face 52 is engaged with the first annular ratchet face 41 of the ratchet disc 40, and the hub 20 is driven forward to compress the elastic expansion member (omitted in the figure) for accumulating the elastic force. Then, as shown in FIG. 12, the gear barrel 30 is in a fixed mode state, that is, the bicycle's rear wheel is idling forwards and not driven, and in this state, the double-sided free toothed disc 50 is disengaged by the pushed force of the axial repulsion member 80B to the left in the figure, so the double-sided free toothed disc 50 is pushed back to the right in the figure (as shown in arrow L9 of FIG. 12) by the elastic release action of the elastic expansion member (omitted in the figure), and the bracing end 852 of the elastic swinging claw 85 is restored to the pressed angle state by the elastic force of the torsion spring 86, and the ratchet disc 40 and the double-sided free toothed disc 50 are completely disengaged to form the gap in a ratchet face zero-resistance state.

Figure 13:
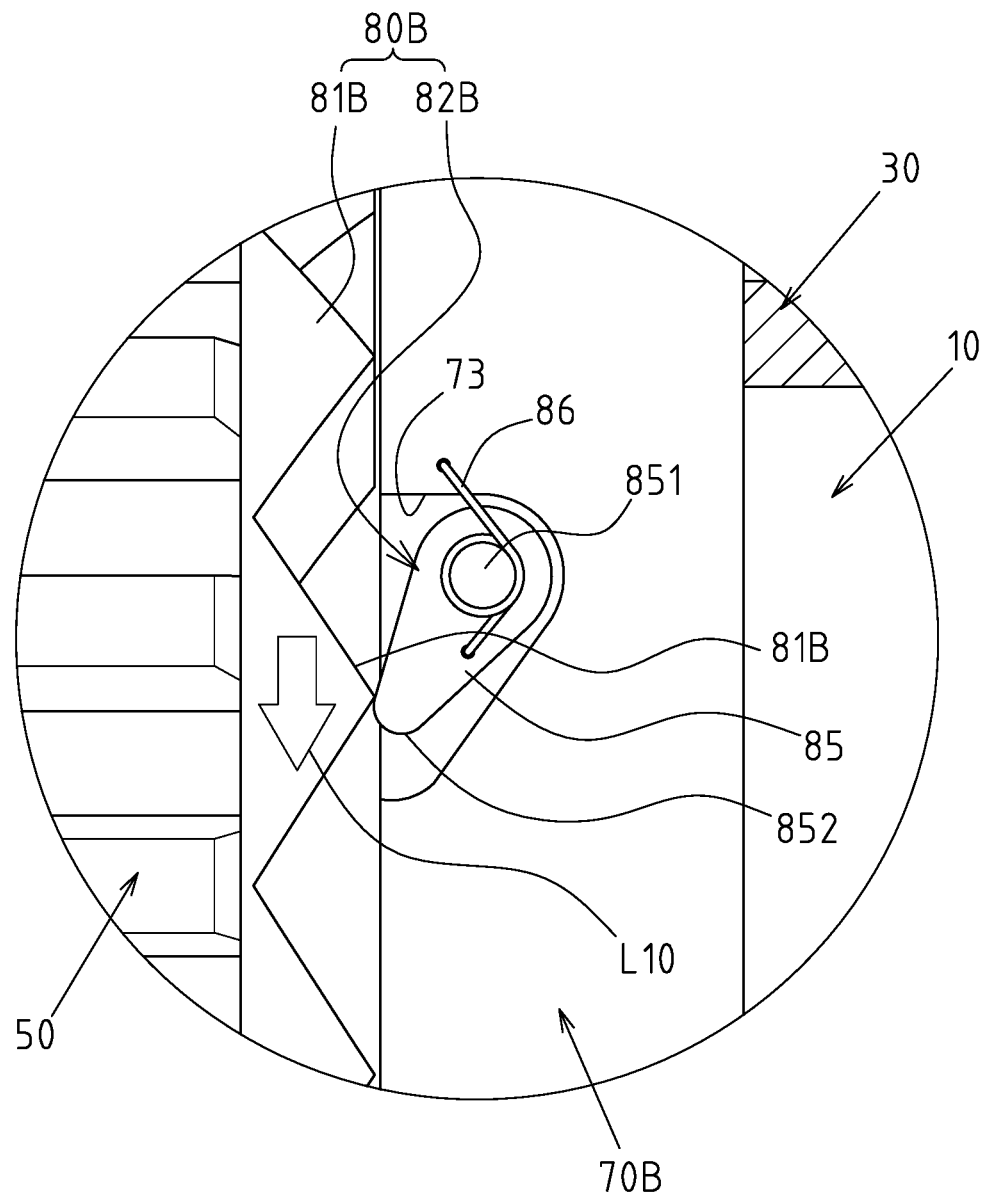
FIG. 13 is a schematic diagram of the gear barrel in a reverse drive mode disclosed in FIG. 11.

In the embodiment disclosed herein, when the first barrel repulsion part 81B of the annular ridge-shaped tooth face is reversed by the gear barrel 30 in the reverse driving mode as shown in FIG. 13, the bracing end 852 of each elastic swinging claw 85 is in the elastic pressed angle state, the first repulsion part 81B must cross over the bracing end 852 of the elastic swinging claw 85 (as shown in arrow L10).

I claim:

1. A hub assembly comprising:
    a mandrel;
    a hub screwed in said mandrel, said hub having a driven end;
    a gear barrel screwed in said mandrel, said gear barrel positioned adjacent to the driven end of said hub, said gear barrel having a gear sleeve at an outer periphery thereof, said gear barrel being concave so as to form a first housing part and a second housing part sequentially with respect to the driven end of said hub, said gear barrel having a forward rotation position and a reversed rotation position and a non-rotation position with respect to said hub;
    a ratchet disc fixed in the driven end of said hub so as to be in rotational relationship with said hub, said ratchet disc having a first annular ratchet face corresponding to said gear barrel, the first annular ratchet face having a first oblique toothed rim;
    a double-sided free toothed disc mounted in the first housing part of said gear barrel, said double-sided free toothed disc being selectively movable by an axial displacement of said gear barrel, said double-sided free toothed disc having a second annular ratchet surface and a pushed face, the second annular ratchet surface having a second oblique toothed rim, the second oblique toothed rim being a steering engagement relationship with the first oblique toothed rim;
    an elastic expansion member disposed between said ratchet disc and said double-sided free toothed disc so as to urge said double-sided free toothed disc away from said ratchet disc, the first annular ratchet face and the second annular ratchet surface being disengaged from each other when said gear barrel is a fixed position;
    a repulsion disc mounted in the second housing part of said gear barrel, said repulsion disc having an outer circumference defining a gap with the second housing part of said gear barrel, said repulsion disc having a withstanding face; and
    an axial repulsion part having a first repulsion part and a second repulsion part, the first repulsion part being disposed in the pushed face of said double-sided free toothed disc, the second repulsion part being disposed in the withstanding face of said repulsion disc, the first repulsion part and the second repulsion part generating an axial mutual pushing force when said gear barrel is in the forward rotation position and when said double-sided free toothed disc is rotated relative to said repulsion disc such that said double-sided free toothed disc is pushed toward said ratchet disc to engage the second annular ratchet surface from the first annular ratchet surface.

2. The hub assembly of claim 1, wherein the outer circumference of said double-sided free toothed disc and the first housing part of said gear barrel have an annular toothed rim so as to cause said double-sided free toothed disc and said gear barrel to be in a synchronous rotational relationship.

3. The hub assembly of claim 2, wherein the first repulsion part and the second repulsion part are in a ridge-shaped tooth face engagement, an elastic top bracing member being disposed between said repulsion disc and a fixed face of the second housing part of said gear barrel, an elastic force of the elastic top bracing member being greater than an elastic force of said elastic expansion member, said mandrel having a directional guiding limit member adapted to limit the displacement of said repulsion disc within a travel range, wherein a minimum depth of engagement between the first oblique toothed rim and the second oblique toothed rim is greater than a maximum depth of engagement between the ridge-shaped tooth face at the first repulsion part and the second repulsion part.

4. The hub assembly of claim 3, wherein said elastic expansion member is a coil spring.

5. The hub assembly of claim 3, wherein said elastic expansion member comprises a first magnetic body and a second magnetic body respectively disposed between said ratchet disc and said double-sided free toothed disc, the first magnetic body and the second magnetic body having identical polarities so as to be in a repulsive relationship.

6. The hub assembly of claim 3, wherein the elastic top bracing member is selected from the group consisting of a coil spring, a wave-shaped spring and a pair of magnetic bodies.

7. The hub assembly of claim 2, wherein the first repulsive part has a ridge-shaped tooth face, the second repulsive part having a plurality of elastic swinging claws disposed on the withstanding face of said repulsion disc, each of the plurality of elastic swinging claws having a pivoting end and a bracing end, the bracing end abutting a tooth button of the ridge-shaped tooth face, each of the plurality of elastic swinging claws having a torsion spring that urges on the bracing end, the withstanding face of said repulsion disc having a limiting rim that corresponds to each of the plurality of elastic swinging claws, wherein said elastic expansion member elastically pushes said double-sided free toothed disc away from said ratchet disc so as to disengage the first annular ratchet surface from the second annular ratchet surface.

* * * * *